United States Patent
Timner et al.

(10) Patent No.: US 8,612,817 B2
(45) Date of Patent: *Dec. 17, 2013

(54) METHOD AND APPARATUS FOR SELECTIVE ACKNOWLEDGEMENT

(71) Applicant: Telefonaktiebolaget L M Ericsson (publ), Stockholm (SE)

(72) Inventors: Ylva Timner, Lulea (SE); Håkan Persson, Solna (SE); Håkan Axelsson, Linkoping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/681,583

(22) Filed: Nov. 20, 2012

(65) Prior Publication Data

US 2013/0080851 A1 Mar. 28, 2013

Related U.S. Application Data

(63) Continuation of application No. 12/297,582, filed as application No. PCT/SE2006/050080 on Apr. 19, 2006, now Pat. No. 8,341,478.

(51) Int. Cl.
*G08C 25/02* (2006.01)
(52) U.S. Cl.
USPC .......................................................... 714/748
(58) Field of Classification Search
USPC .......................................................... 714/748
See application file for complete search history.

(56) References Cited

U.S. PATENT DOCUMENTS

| 5,974,028 | A | 10/1999 | Ramakrishnan |
| 6,367,045 | B1 | 4/2002 | Khan et al. |
| 6,694,471 | B1 | 2/2004 | Sharp |
| 7,630,305 | B2 | 12/2009 | Samuels et al. |
| 2006/0259844 | A1 | 11/2006 | Kawada |
| 2006/0259845 | A1 | 11/2006 | Baek |
| 2008/0022178 | A1 | 1/2008 | Kim et al. |
| 2009/0150737 | A1 | 6/2009 | Wang et al. |

FOREIGN PATENT DOCUMENTS

WO    WO 01/22646 A1    3/2001

OTHER PUBLICATIONS

International Search Report and Written Opinion of the International Searching Authority, PCT/SE2006/050080, Feb. 1, 2007.
Jungmaier "SCTP for Beginners", sections 1-9, 2001-2003, http://tdrwww.iem,uni-due.de/inhalt/forschung/sctp_fb/sctp_intro.html, 32 pp.

*Primary Examiner* — Michael Maskulinski
(74) *Attorney, Agent, or Firm* — Myers Bigel Sibley & Sajovec, P.A.

(57) ABSTRACT

A transceiving unit receives at least one sequence of data blocks where the data blocks each have a respective sequence number. The receipt of the data blocks is monitored to establish whether the data blocks have been successfully received or not. A receipt report is selectively generated based at least in part on the performed monitoring. The receipt report includes at least one data part in accordance with a predetermined data format, which includes at least a first data portion with information identifying a sequence number of one data block in the sequence that has not been successfully received and a second data portion with information on whether successful receipt has been achieved for a number of data blocks in the sequence having sequence numbers following directly after the identified sequence number. The receipt report is provided in a generated data block that is transmitted.

23 Claims, 2 Drawing Sheets

| No. of data flows (N) | 1 | 2 | 3-4 | 5-8 | 9-16 |
|---|---|---|---|---|---|
| Size of address field (A) | 0 | 1 | 2 | 3 | 4 |
| Size of BSN_MAP | 12 | 11 | 10 | 9 | 8 |

METHOD AND APPARATUS FOR SELECTIVE ACKNOWLEDGEMENT

CROSS REFERENCE TO RELATED APPLICATION

The present application is a continuation of U.S. patent application Ser. No. 12/297,582, having a filing date of Mar. 9, 2009, which itself is a §371 national stage application of PCT International Application No. PCT/SE2006/050080, filed Apr. 19, 2006, the disclosure and content of both of which is incorporated herein by reference in its entirety.

TECHNICAL FIELD

The present invention pertains to the field of data communications; and in particular to the part of this field that relates to receipt reporting.

BACKGROUND

Today there is an increasing interest in data communications. In data communications, the data (e.g. application data) that is to be sent from a source to a recipient is often sent using a sequence of data blocks or packets. The data blocks that are not successfully received by the recipient may have to be retransmitted. To effect retransmissions, one or more receipt reports may be sent back to the source, in order to inform the source of the data blocks that need to be retransmitted. The receipt reports may in principle include two basic forms of information: acknowledgement (ACK) indicating that a particular data block has been successfully received; or negative acknowledgement (NACK) indicating that the particular data block has not been successfully received. Hereinafter, the term ACK/NACK information will be used for information that includes ACK and/or NACK information.

Data communications are becoming increasingly important also in wireless communications. For example, in the EDGE standard (Enhanced Data rates for GSM Evolution) there are several RLC (Radio Link Control) operation modes available for data transmission, for example: acknowledged mode; and un-acknowledged mode. In un-acknowledged mode, there are no retransmissions, and delays are therefore kept at a minimum. However, bandwidth is wasted since powerful channel coding must be used to guarantee an acceptable FER (Frame Erasure Rate)/BLER (BLock Error Rate). In acknowledged mode, data blocks are re-transmitted until successfully received, regardless of any delay requirements. Since the number of re-transmissions is unlimited, it is not possible to guarantee that an acknowledged mode bearer will keep any delay requirements. Also, the ACK/NACK information is sent in special messages that require one full radio block for transmission. In order to keep the transmission delays at a minimum, ACK/NACK information should ideally be requested immediately after each transmission. However, such a practice would cause unacceptable overhead, since receipt reporting would consume half of a used radio resource. Consequently, the ACK/NACK information protocol in EDGE is not designed for delay sensitive services. Overhead would be significant if ACK/NACK information messages would be sent after each transmission. Also, currently it is not possible to limit the number of re-transmissions, so the transmission delays may be very large, especially for low C/I values.

In 3GPP/GERAN, the Siemens company has made a proposal (see 3GPP TSG-GERAN Meeting #27 Tdoc GP-052634: 'Fast Ack/Nack reporting') for a protocol for receipt reporting for GERAN. The proposal basically defines a concept where a mobile station can send a short bitmap in an uplink radio block in response to a polling request from a radio access network. The polling request is also a synchronization event between the radio access network and mobile station, allowing a receiver in the radio access network to know which data blocks are covered by the short bitmap. The short bitmap contains ACK/NACK information relating to recently received data blocks. More precisely, if the polling request is received at a frame number x, the mobile station will send back the short bitmap indicating the status of all the data blocks received in all assigned timeslots during frames x, x−1, . . . , x−n, where n depends on a defined size of the short bitmap and the number of assigned timeslots.

There are, however, some drawbacks with the Siemens proposal. The proposal is based on the polling requests from the radio access network, so ACK/NACK information is requested periodically, even if all data blocks have been successfully received by the recipient. This causes extra overhead, in particular, if there are few uplink transmissions. Furthermore, the proposal also suggests a particular form of channel coding that is not currently supported by all standards, e.g. the EDGE standard. The proposal is thus rather inflexible.

Consequently, there is a need for receipt reporting that is flexible and applicable to delay sensitive applications.

SUMMARY

The present invention addresses a problem overcoming at least one of the above-indicated drawbacks.

According to one aspect of the invention, the above-stated problem is solved with a method for a transceiving unit. The transceiving unit is operated to receive at least one sequence of data blocks where the data blocks each have a respective sequence number. The receipt of the data blocks is monitored to establish whether the data blocks have been successfully received or not. A receipt report is selectively generated based at least in part on the performed monitoring. The receipt report includes at least one data part in accordance with a predetermined data format, which includes at least a first data portion with information identifying a sequence number of one data block in the sequence that has not been successfully received and a second data portion with information on whether or not successful receipt has been achieved for a number of data blocks in the sequence having sequence numbers following directly after the identified sequence number. The receipt report is provided in a generated data block that is transmitted from the transceiving unit.

According to another aspect of the invention, the above-stated problem is solved with a transceiving unit comprising means for performing the above-indicated method.

According to yet another aspect of the invention, the above-indicated problem is solved with a data block including a receipt report relating to receipt of data blocks in a sequence where the data blocks each have a respective sequence number. The receipt report includes at least one data part in accordance with a predetermined data format, which includes at least a first data portion with information identifying a sequence number of one data block in the sequence that has not been successfully received and a second data portion with information on whether or not successful receipt has been achieved for a number of data blocks in the sequence having sequence numbers following directly after the identified sequence number.

According to a further aspect of the invention, the above-stated problem is solved with a receipt report generator that selectively generates a receipt report relating to receipt of data blocks in a sequence where the data blocks each have a respective sequence number. The receipt report generator is adapted for generating a receipt report that includes at least one data part in accordance with a predetermined data format, which includes at least a first data portion with information identifying a sequence number of one data block in the sequence that has not been successfully received and a second data portion with information on whether or not successful receipt has been achieved for a number of data blocks in the sequence having sequence numbers following directly after the identified sequence number.

The invention has several advantages. The invention provides receipt reporting that is flexible. The receipt reporting does not have to rely on polling requests, but can be performed in response to a wide selection of events. Furthermore, the receipt reporting does not rely on any particular type of channel coding. Moreover, the receipt reporting according to the invention can also easily be applied for delay sensitive applications.

DETAILED DESCRIPTION

The invention will now be described further using preferred embodiments and referring to the drawings. Reference will sometimes be made to particular standards, such as the EDGE standard. Such references are only made to provide clear and concrete examples and are not to be viewed as limiting.

Figure 1:
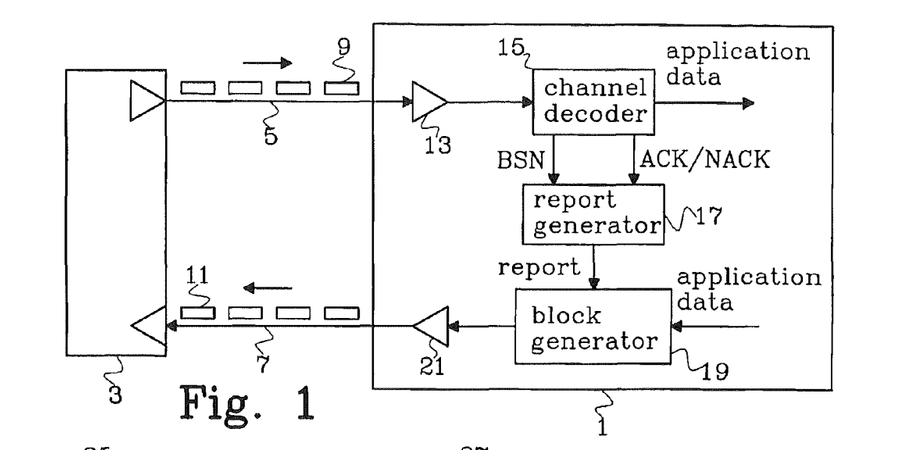
FIG. 1 is a block diagram illustrating data communications with receipt reporting between two transceiving units in accordance with an exemplary embodiment of the invention.
Figure 2:
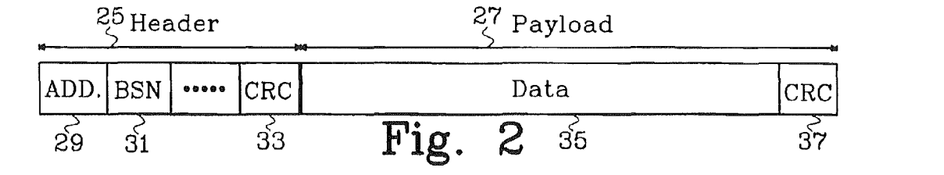
FIG. 2 is diagram illustrating a conventional data block structure.

FIG. 1 is a block diagram illustrating data communications between a first transceiving unit 1 and a second tranceiving unit 3 in accordance with an exemplary embodiment of the invention. The data communications occur on a first link 5, which is available for data transmissions from the second transceiving unit 3 to the first transceiving unit 1, and on a second link 7, which is available for data transmissions from the first tranceiving unit 1 to the second transceiving unit 3. The data transmissions from the second tranceiving unit 3 include a sequence of data blocks, one such data block being referenced by reference numeral 9 in FIG. 1. FIG. 2 illustrates a typical example of a conventional data block structure. The data block in FIG. 2 includes a header 25 and a payload 27.

The header 25 includes a data address 29 specifying a recipient of the data block, e.g. the first transceiving unit 1. The header 25 further includes a Block Sequence Number 31 (BSN), which specifies an intended position for the data block in a sequence of data blocks. Consequently, BSN=0 for the first data block in the sequence, BSN=1 for the second data block in the sequence, and so on. In FIG. 2, the payload 27 of the data block includes an application data field 35. In order to achieve error detection and/or correction in data blocks, redundancy information is often added. In the example of FIG. 2, two CRC (Cyclic Redundancy Check) fields 33 and 37 have been added. The CRC field 33 provides error detection with respect to the header 25, and the CRC field 37 provides error detection with respect to the payload 27.

In a particular embodiment, the transceiving units 1 and 2 may be nodes in a wireless communications system, e.g. in accordance with the EDGE standard or some other wireless standard. In such an embodiment, one of the transceiving units 1 or 3 may be a base station or some other form of radio access point, and the other transceiving unit 3 or 1 may be a wireless user equipment, such as mobile telephone or other communications device. The links 5 and 7 may be radio links. In an EDGE specific embodiment, the data blocks 9 and 11 may be so-called radio blocks. According the EDGE standard, the radio blocks are defined on layers two and three, using the terminology of the OSI model. The radio blocks are mapped onto a physical layer defined by a number of time slots. According to the EDGE standard, each radio block is mapped onto four of the time slots.

Referring again to FIG. 1, a design and operation of the first transceiving unit 1 will now be described in more detail. The first transceiving unit 1 includes a receiver 13 for receiving the sequence of data blocks 9 transmitted from the second transceiving unit 3. A channel decoder 15 connected to the receiver 13 tries to decode each received data block 9. If the decoding is successful, the channel decoder 15 will output the application data that was included in the received data block. A receipt report generator 17 is connected to the channel decoder 15, which provides the receipt report generator 17 with the BSN of each data block that has been received by the receiver 13, provided of course that the received data block is not corrupted to such an extent that the BSN cannot be identified. Together with each provided BSN, the channel decoder 15 also provides the receipt report generator 17 with ACK/NACK information relating to the data block associated with the provided BSN, i.e. information on whether or not the data block associated with the provided BSN has been successfully received (i.e. successfully decoded). Based on the information (BSN,ACK/NACK) provided by the channel decoder 15, the receipt report generator selectively generates receipt reports in a predetermined format; this will be described in more detail below. The first transceiving unit 1 also includes a data block generator 19, which is adapted to receive application data that is intended for transmission to the second transceiving unit 3. The data block generator 19 generates a sequence of data blocks that include the received application data. The generated data blocks are fed to a transmitter 21, which transmits the generated data blocks to the second transceiving unit 3 over the second link 2. One of these transmitted data blocks is referenced by reference numeral 11 in FIG. 1. The receipt report generator 17 is connected to the data block generator 19. When a receipt report has been generated, the receipt report generator 17 sends the receipt report to the data block generator 19, which includes the receipt report in one of the generated data blocks. The receipt report is thus "piggy-backed" on one of the generated data blocks. When the second transceiving unit receives a data block including a receipt report, the second transceiving unit 3 extracts the receipt report and uses the receipt report for scheduling of data retransmissions to the first transceiving unit 1.

FIGS. 3 to 6 show exemplary embodiments describing how a receipt report can be formatted and included in a data block according to the invention. Several features of the data block structures in FIGS. 3 to 6 correspond to features of the data block structure in FIG. 2; these features have been given the same reference numerals as the corresponding features in FIG. 2 and will not be discussed in detail again.

Figure 3:
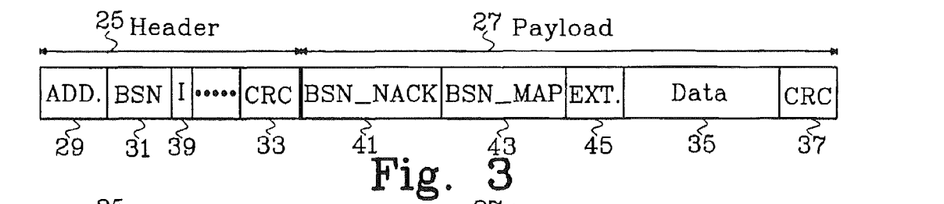
FIG. 3 is diagram illustrating a data block structure provided with a receipt report in accordance with an exemplary embodiment of the invention.

Reference is now made to FIG. 3, which is a diagram showing a data block structure provided with a receipt report according to an exemplary embodiment of the invention. The data block structure includes an indicator field 39 that contains information indicating whether or not the data block has been provided with a receipt report. In this embodiment, by way of example only, the indicator field 39 is located in the header 25. The receipt report includes in this embodiment at least a first data part having predetermined data format. This format includes a first data portion 41 (BSN_NACK, which includes information establishing a BSN of one data block in the sequence that has not yet been successfully received by the first transceiving unit 1. The predetermined data format further includes a second data portion 43 (BSN_MAP), which includes ACK/NACK information relating to a number of data blocks that have BSNs that follow directly and sequentially after the BSN indicated in the first data portion 41. The ACK/NACK information may be in the form of a bitmap with a number of bits, where, for example, one (1) may indicate an ACK and zero (0) may indicate a NACK. Furthermore, an extension field 45 is included in the data block. The extension field 45 provides an indication of whether or not a further data part in accordance with the predetermined data format is included in the data block. Consequently, if the extension field 45 so indicates, the data block will include additional first and second data portions (BSN_NACK and BSN_MAP) and possibly also an additional extension field. In this way, an amount of information in the receipt report may be adapted to the particular needs of any situation. In the embodiment of FIG. 3, by way of example only, the first and second data portions 41 and 43 and the extension field 45 are located in the payload 27. A concrete example will now be given.

Indication Field 39:
  One bit used in header 25.
    0: No receipt report included in data block.
    1: Receipt report included in data block, at least two bytes of payload 27 used for the receipt report.
Receipt Report (if indication bit is one):
  Eleven bit BSN_HACK in first data portion 41 in payload 27, making it possible to indicate BSN numbers from 0 to 2047.
  Four bit BSN_MAP in second data portion 43 in payload 27.
  One bit extension in extension field 45 in payload.
    0: No further information in receipt report.
    1: The following two bytes are also part of receipt report, format same as above (11 bit BSN_NACK, 4 bit BSN_MAP and 1 bit extension).

Assume, for example, that data blocks having BSNs 3, 5, 6 have not been successfully received. Then: BSN_NACK=3, BSN_MAP=1001 (covering BSNs 4-7), extension bit=0.

Assume, instead, that data blocks having BSNs 3, 5, 6, 12, 15 have not been successfully received. Then: BSN_NACK=3, BSN_MAP=1001 (covering BNSs 4-7), extension bit=1, indicating additional two bytes: BSN_NACK=12, BSN_MAP=1101 (covering BNSs 13-16), extension bit=0.

Figure 4:
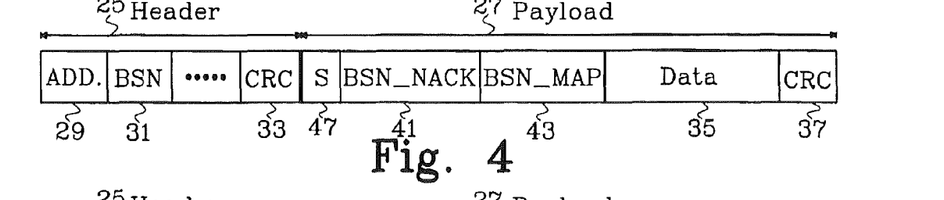
FIG. 4 is diagram illustrating a data block structure provided with a receipt report in accordance with an exemplary embodiment of the invention.

Reference is now made to FIG. 4, which is a diagram showing a data block structure provided with a receipt report according to an exemplary embodiment of the invention. This data block structure is similar to the one in FIG. 3 and includes also a receipt report with a first data part having a first data portion 41 with BSN_NACK and a second data portion 43 with a BSN_MAP. However, in this embodiment, the indication field 39 and the extension field 45 have been replaced with a size field 47 including information establishing an information size, i.e. the amount of data, included in the first and second data portion 41 and 43. The size field 47 may, for example, indicate a number of bits or bytes included in the first and second data portion 41 and 43. In embodiments where one of the data portions 41 or 43 has a fixed information size and the other portion has a variable information size, the size field 47 may indicate the information size of the data portion having variable size or the combined information size of both data portions 41 and 43. In the embodiment of FIG. 4, by way of example only, the size field 47 is located in the payload 27. If the size field 47 is set to indicate zero information size, this means that the first and second data portion 41 and 43 are dispensed with in that particular data block, i.e. no ACK/NACK information included. A concrete example will now be given.

Receipt Report:
  Eight bit information size data in size field 7 indicating a total number of bytes in first and second data portions 41 and 43.
  Eleven bit (fixed) BSN_NACK in first data portion 41 in payload 27, making it possible to indicate BSN numbers from 0 to 2047.
  Information size *8-11 bit BSN_MAP in second data portion 43 in payload 27.

Assume, for example, that data blocks having BSNs 3, 5, 6 have not been successfully received. Then: information size data=2, BSN_NACK=3, BSN_MAP=10011 (covering BSNs 4-8).

Assume, instead, that data blocks having BNSs 3, 5, 6, 12, 15 have not been successfully received. Then: information size data=3, BSN_NACK=3, BSN_MAP=1001111101101 (covering BSNs 4-16).

Figure 5:
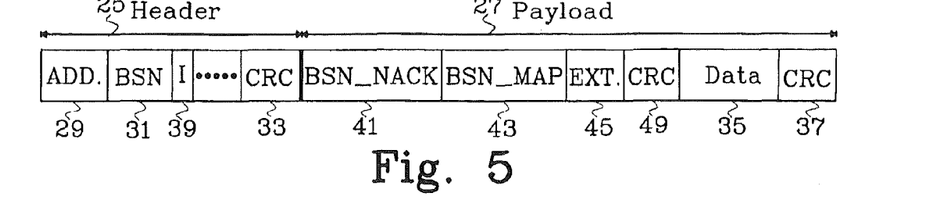
FIG. 5 is diagram illustrating a data block structure provided with a receipt report in accordance with an exemplary embodiment of the invention.

Reference is now made to FIG. 5, which is a diagram illustrating a data block structure provided with a receipt report according to an exemplary embodiment of the invention. According to the invention, it is suggested to provide additional redundancy information (channel coding) that relates exclusively to information in the receipt report. This will make the receipt reporting more robust to channel errors. The redundancy information provides error detection and/or error correction exclusively for information contained in the receipt report. In the embodiment of FIG. 5, redundancy information is provided, by way of example only, in the form of an additional CRC field 49. The data block structure is otherwise the same as in FIG. 3. The CRC field 49 provides, in this embodiment, error detection exclusively for the information contained in the first and second data portion 41 and 43. Note that the CRC field 37 provides error detection for the whole of the payload 27 and not specifically for information in the receipt report. The CRC field 49 is advantageous, in particular, if the total amount of data in the payload 27 is large compared to the amount of data in the receipt report, since the information in the receipt report is likely to be correct even if the payload as a whole is not error free. Consequently, it may be possible to verify that the information in the receipt report is correct even though the application data 35 may have to be retransmitted due to channel errors. A concrete example will now be given.

Indication Field 39:
  One bit used in header 25.
    0: No receipt report included in data block.
    1: Receipt report included in data block, at least two bytes of payload 27 used for the receipt report.
Receipt Report (if indication bit is one):
  Eleven bit BSN_NACK in first data portion 41 in payload 27, making it possible to indicate BSN numbers from 0 to 2047.
  Nine bit BSN_MAP in second data portion 43 in payload 27.
  One bit extension in extension field 45 in payload.
    0: No further information in receipt report.
    1: The following two bytes are also part of receipt report, format same as above (11 bit BSN_NACK, 4 bit BSN_MAP and 1 bit extension).
  Three bit CRC code in CRC field 49.

Assume, for example, that data blocks having BSNs 3, 5, 6 have not been successfully received. Then: BSN_NACK=3, BSN_MAP=100111111 (covering BSNs 4-12), extension bit=0, CRC=(depends on which CRC algorithm is used).

Assume, instead, that data blocks having BSNs 3, 5, 6, 12, 15 have not been successfully received. Then: BSN_NACK=3, BSN_MAP=100111110 (covering BSNs 4-12), extension bit=1, indicating a further 2 bytes of ACK/NACK information, CRC=(depends on which CRC algorithm is being used), Extension data (since extension bit=1): BSN_NACK=15, BSN_MAP=111111111, CRC=(depends on which CRC algorithm is being used).

Figure 6:
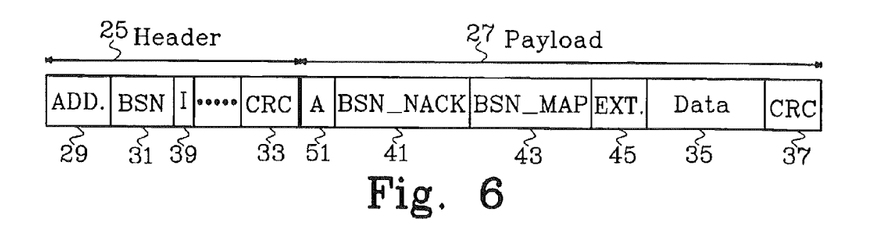
FIG. 6 is a diagram illustrating a data block structure provided with receipt report in accordance with an exemplary embodiment of the invention.

Additional redundancy information may of course be provided also in the embodiments of FIGS. 3, 4 and 6, e.g. in a similar manner as in the embodiment of FIG. 5.

Reference is now made to FIG. 6, which is a diagram illustrating a data block structure provided with a receipt report according to an exemplary embodiment of the invention. It is here suggested that the receipt report be complemented with an additional address field 51 (A); the data block structure of FIG. 6 is otherwise the same as the data block structure in FIG. 3. The additional address field 51 is included in the data block in order to support several separate data flows. Each data flow is provided using a respective sequence of data blocks. Consequently, in this embodiment, the first transceiving unit 1 is receiving several sequences of data blocks, the data blocks of each sequence being separately numbered with BNSs. The additional address field 51 includes information identifying which one of the data flows that the receipt report concerns. In this way, it is possible to receive several sequences of data blocks and to provide receipt reports relating to any one the sequences. The additional address field 51 can have a predetermined fixed information size, or it can have a variable information size that depends on the number of different data flows that are currently active for the first transceiving unit 1. The additional address field 51 may of course also be included in any of the other embodiments disclosed or indicated above.

In an EDGE specific embodiment, the additional address field 51 can be used to address different Temporary Block Flows (TBF). Alternatively, in an embodiment where the first transceiving unit 1 is a base station maintaining communications with several user equipments, the additional address field 51 can be used to address different user equipments.

A concrete example will now be given.
Indication Field 39:
  One bit used in header 25.
    0: No receipt report included in data block.
    1: Receipt report included in data block, at least three bytes of payload 27 used for the receipt report.
Receipt Report (if indication bit is one):
  ceil($\log_2(N)$) bit additional address field 51 in payload 27, where N is the number of different data flows allocated to the first transceiving unit 1.
  Eleven bit BSN_NACK in first data portion 41 in payload 27.
  12−ceil($\log_2(N)$) bit BSN_MAP in the second data portion 43 in payload 27.
  One bit extension field 45 in payload 27
    0: No further ACK/NACK information included in data block.
    1: Following three bytes are also used for ACK/NACK information (same format as above).

Above, use has been made of the function cell (from the English word ceiling). For any real number x, the function cell can be defined through the equation ceil(x)=k∈Z: 0≤k−x<1, where Z is the set of all integers. Or put more plainly, ceil(x) is the smallest integer that is not less than x.

Figure 7:
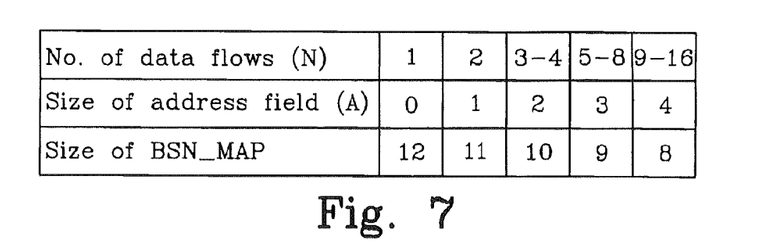
FIG. 7 is a table illustrating field sizes for a receipt report for multiple data flows in accordance with an exemplary embodiment of the invention.

In the example, the additional address field 51 has a variable information size, which depends on the number of data flows that are active for the first transceiving unit 1. Furthermore, the second data portion 43 (BSN_MAP) has an information size that varies in a corresponding manner to accommodate for the variable information size of the additional address field 51, as is illustrated in a table presented in FIG. 7.

Figure 8:
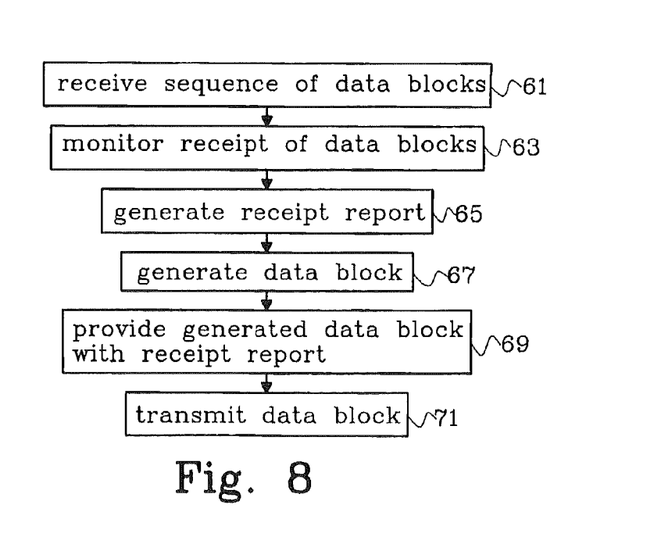
FIG. 8 is a flow chart illustrating a method according to an exemplary embodiment of the invention.

FIG. 8 is a flow chart illustrating a method of how the first transceiving unit 1 may be adapted to operate according to an exemplary embodiment of the invention. At a step 61, the first transceiving unit 1 is operated to receive a sequence (or several sequences) of data blocks. At a step 63, the receipt of the data blocks is monitored to determine whether or not the data blocks have been successfully received. At step a 65, a receipt report is selectively generated based on the monitoring performed in the step 63. The receipt report can be in any of the formats disclosed and indicated above. The time when a receipt report is generated is very flexible and can be based on any number of events in the first transceiving unit 1 and does not have to depend, for example, on requests from the second transceiving unit 3. For example, the receipt report may be generated in response to a first or a new unsuccessful receipt of a data block in the sequence of data blocks, and/or the receipt report may be generated in response to a timer timeout, even if no unsuccessful receipts of data blocks have been detected, so that receipt reports are sent regularly, so e.g. the second transceiving unit 3 knows that data is received. At steps 67 and 69, a new data block is generated and provided with the generated receipt report. The generated data block also includes application data intended, for example, for the second transceiving unit 3, but alternatively, the generated data block may be a data block exclusively used for receipt reporting. At a step 71, the generated data block is transmitted from the first transceiving unit 1 to the second transceiving unit 3.

The ACK/NACK information is based on BSN, so all blocks within a transmission window can be addressed. As long as the transmission window is sufficiently long, the ACK/NACK information is still valid in retransmitted blocks. (Even though the information might be outdated.) Therefore it is not necessary to change the payload between transmissions, and error correcting schemes using several transmission attempts (i.e. incremental redundancy.) can be taken advantage of.

The above-indicated structures for receipt reporting are very flexible and may be used as stand-alone or be combined with full size reports sent with maximum channel coding in order to improve reliability. It is possible to use minimal overhead if ACK/NACK information is only included once after an erroneous receipt of a data block, or the reliability could be maximized by including ACK/NACK information in every block in a reverse direction.

Through the combination of BSN_NACK and BSN_MAP, block errors on a bursty channel can efficiently be reported. The use of extension bits or size bits make the reporting resource efficient so that it can use minimal overhead when the errors are few, and more overhead if needed to report many block errors.

The invention claimed is:

1. A method in a first transceiving unit capable of two-way communications with at least a second transceiving unit, the method comprising:
   operating the first transceiving unit to receive a sequence of data blocks transmitted from the second transceiving unit, each data block in the sequence having a respective sequence number establishing its intended position in the sequence;
   monitoring whether or not the data blocks in the sequence have been successfully received;
   generating a receipt report based at least in part on the monitoring;
   generating a data block that includes the receipt report; and
   transmitting the generated data block to the second transceiving unit,
   wherein the generated receipt report includes a first data portion and a second data portion, the first data portion identifying a sequence number of one data block in the sequence that has not been successfully received, the second data portion providing information on whether or not successful receipt has been achieved for a number of data blocks in the sequence having sequence numbers following directly after the identified sequence number; and
   wherein the generated receipt report further includes an extension data portion indicating whether or not an additional first data portion identifying an additional sequence number of one data block in the sequence that has not been successfully received, and an additional second data portion providing information on whether or not successful receipt has been achieved for a number of data blocks in the sequence having sequence numbers following directly after the identified additional sequence number.

2. The method according to claim 1, wherein the generating the receipt report comprises:
   providing the receipt report with a data size portion establishing an information size of at least one of the first data portion identifying the sequence number of the one data block in the sequence that has not been successfully received or the second data portion providing information on whether or not successful receipt has been achieved for the number of data blocks in the sequence having sequence numbers following directly after the identified sequence number.

3. The method according to claim 1, further comprising providing the generated data block with information indicating that the receipt report has been provided in the generated data block.

4. The method according to claim 1, further comprising:
   operating the first transceiving unit to receive one or more further sequences of data blocks,
   wherein the generating the receipt report includes providing the receipt report with information indicating which of the sequences of data blocks the receipt report concerns.

5. The method according to claim 4, wherein each sequence of data blocks is allocated for a respective data flow activated for the first transceiving unit.

6. The method according to claim 1, wherein the generated data block includes application data.

7. The method according to claim 1, wherein the first transceiving unit is a node of wireless communications system.

8. A method in a first transceiving unit capable of two-way communications with at least a second transceiving unit, the method comprising:
   operating the first transceiving unit to receive a sequence of data blocks transmitted from the second transceiving unit, each data block in the sequence having a respective sequence number establishing its intended position in the sequence;
   monitoring whether or not the data blocks in the sequence have been successfully received;
   generating a receipt report based at least in part on the monitoring;
   generating a data block that includes the receipt report, wherein the generated receipt report includes a first data portion and a second data portion, the first data portion identifying a sequence number of one data block in the sequence that has not been successfully received, the second data portion providing information on whether or not successful receipt has been achieved for a number of data blocks in the sequence having sequence numbers following directly after the identified sequence number,
   and wherein the generated data block further includes redundancy information that relates exclusively to the first data portion identifying the sequence number of the one data block in the sequence that has not been successfully received or the second data portion providing information on whether or not successful receipt has been achieved for the number of data blocks in the sequence having sequence numbers following directly after the identified sequence number in the receipt report; and
   transmitting the generated data block to the second transceiving unit.

9. The method according to claim 8, wherein the redundancy information provides at least one of error correction or error detection with respect to the first data portion or the second data portion.

10. The method according to claim 8, wherein the predetermined data includes at least the first data portion and the second data portion.

11. A transceiving unit capable of two-way communications with at least one other transceiving unit, the transceiving unit comprising:
   at least one receiver configured to receive a sequence of data blocks transmitted from the other transceiving unit, each data block in the sequence having a respective sequence number establishing its intended position in the sequence;
   a channel decoder, operationally connected to the at least one receiver, configured to decode received data blocks in the sequence of data blocks and to monitor whether or not the received data blocks have been successfully received;
   a receipt report generator, operationally connected to the channel decoder, configured to generate a receipt report based at least in part on the monitoring performed by the channel decoder;

a data block generator, operationally connected to the receipt report generator, configured to generate a data block that includes the receipt report; and at least one transmitter, operationally connected to the data block generator, configured to transmit the generated data block to the other transceiving unit, wherein the receipt report generator generates the receipt report to include a first data portion and a second data portion, the first data portion identifying a sequence number of one data block in the sequence that has not been successfully received, the second data portion providing information on whether or not successful receipt has been achieved for a number of data blocks in the sequence having sequence numbers following directly after the identified sequence number, wherein the receipt report generator is configured to further include in the receipt report an extension data portion indicating whether or not an additional first data portion identifying an additional sequence number of one data block in the sequence that has not been successfully received, and an additional second data portion providing information on whether or not successful receipt has been achieved for a number of data blocks in the sequence having sequence numbers following directly after the identified additional sequence number, are provided in the receipt report.

12. The transceiving unit according to claim 11, where the receipt report generator is configured to provide the receipt report with a data size portion establishing an information size of at least one of the first data portion or the second data portion.

13. The transceiving unit according to claim 11, where the data block generator is to configured provide the generated data block with information indicating that the receipt report has been provided in the generated data block.

14. The transceiving unit according to claim 11, where:
the at least one receiver is configured to receive one or more further sequences of data blocks; and where
the receipt report generator is configured to provide the receipt report with information indicating which of the sequences of data blocks the receipt report concerns.

15. The transceiving unit according to claim 14, where each sequence of data blocks is allocated for a respective data flow activated for the transceiving unit.

16. The transceiving unit according to claim 11, where the generated data block includes application data.

17. The transceiving unit according to claim 11, where the transceiving unit comprises a node of wireless communications system.

18. The transceiving unit according to claim 11, wherein the generated data block and the first data portion identifying the sequence number of the one data block in the sequence that has not been successfully received are in a payload.

19. A transceiving unit capable of two-way communications with at least one other transceiving unit, the transceiving unit comprising:
at least one receiver configured to receive a sequence of data blocks transmitted from the other transceiving unit, each data block in the sequence having a respective sequence number establishing its intended position in the sequence;
a channel decoder, operationally connected to the at least one receiver, configured to decode received data blocks in the sequence of data blocks and to monitor whether or not the received data blocks have been successfully received;

a receipt report generator, operationally connected to the channel decoder, configured to generate a receipt report based at least in part on the monitoring performed by the channel decoder;

a data block generator, operationally connected to the receipt report generator, configured to generate a data block that includes the receipt report; and at least one transmitter, operationally connected to the data block generator, configured to transmit the generated data block to the other transceiving unit, wherein the receipt report generator generates the receipt report to include a first data portion and a second data portion, the first data portion identifying a sequence number of one data block in the sequence that has not been successfully received, the second data portion providing information on whether or not successful receipt has been achieved for a number of data blocks in the sequence having sequence numbers following directly after the identified sequence number, where the data block generator is configured to further include in the generated data block redundancy information that relates exclusively to the first data portion identifying the sequence number of the one data block in the sequence that has not been successfully received or the second data portion providing information on whether or not successful receipt has been achieved for the number of data blocks in the sequence having sequence numbers following directly after the identified sequence number in the receipt report.

20. The transceiving unit according to claim 19, where the redundancy information provides at least one of error correction or error detection with respect to the first data portion or the second data portion.

21. The transceiving unit according to claim 19, where the predetermined data includes at least the first data portion and the second data portion.

22. A method in a second transceiving unit capable of two-way communications with at least a first transceiving unit, the method comprising:
operating the second transceiving unit to transmit a sequence of data blocks for receipt by the first transceiving unit, each data block in the sequence having a respective sequence number establishing its intended position in the sequence;
receiving a data block that includes a receipt report from the first transceiving unit; and
scheduling data retransmissions to the first transceiving unit based on the receipt report,
wherein the receipt report includes a first data portion, a second data portion, an extension data portion, and an additional second data portion,
the first data portion identifying a sequence number of one data block in the sequence that has not been successfully received,
the second data portion providing information on whether or not successful receipt has been achieved for a number of data blocks in the sequence having sequence numbers following directly after the identified sequence number,
the extension data portion indicating whether or not an additional first data portion identifying an additional sequence number of one data block in the sequence that has not been successfully received, and
the additional second data portion providing information on whether or not successful receipt has been achieved for a number of data blocks in the sequence having sequence numbers following directly after the identified additional sequence number.

23. A second transceiving unit capable of two-way communications with at least a first transceiving unit, the second transceiving unit configured to:
- transmit a sequence of data blocks for receipt by the first transceiving unit, each data block in the sequence having a respective sequence number establishing its intended position in the sequence;
- receive a data block that includes a receipt report from the first transceiving unit; and
- schedule data retransmissions to the first transceiving unit based on the receipt report,
- wherein the receipt report includes a first data portion, a second data portion, an extension data portion, and an additional second data portion,
- the first data portion identifying a sequence number of one data block in the sequence that has not been successfully received,
- the second data portion providing information on whether or not successful receipt has been achieved for a number of data blocks in the sequence having sequence numbers following directly after the identified sequence number,
- the extension data portion indicating whether or not an additional first data portion identifying an additional sequence number of one data block in the sequence that has not been successfully received, and
- the additional second data portion providing information on whether or not successful receipt has been achieved for a number of data blocks in the sequence having sequence numbers following directly after the identified additional sequence number.

\* \* \* \* \*

UNITED STATES PATENT AND TRADEMARK OFFICE
CERTIFICATE OF CORRECTION

| | | |
|---|---|---|
| PATENT NO. | : 8,612,817 B2 | Page 1 of 1 |
| APPLICATION NO. | : 13/681583 | |
| DATED | : December 17, 2013 | |
| INVENTOR(S) | : Timner et al. | |

It is certified that error appears in the above-identified patent and that said Letters Patent is hereby corrected as shown below:

On the title page, item (75), under "Inventors", in Column 1, Line 1, delete "Lulea" and insert -- Luleå --, therefor.

On the title page, item (75), under "Inventors", in Column 1, Line 3, delete "Linkoping" and insert -- Linköping --, therefor.

In the Specification

Column 5, Line 21, delete "(BSN_NACK," and insert -- (BSN_NACK), --, therefor.

Column 5, Line 50, delete "BSN_HACK" and insert -- BSN_NACK --, therefor.

Column 8, Line 14, delete "cell" and insert -- ceil --, therefor.

In the Claims

Column 11, Line 34, in Claim 13, delete "to configured" and insert -- configured to --, therefor.

Signed and Sealed this
Sixteenth Day of September, 2014

Michelle K. Lee
*Deputy Director of the United States Patent and Trademark Office*